United States Patent
Ehsan et al.

(10) Patent No.: US 8,824,290 B2
(45) Date of Patent: Sep. 2, 2014

(54) DOWNLINK FLOW CONTROL USING PACKET DROPPING TO CONTROL TRANSMISSION CONTROL PROTOCOL (TCP) LAYER THROUGHPUT

(75) Inventors: Navid Ehsan, San Diego, CA (US); Thomas Klingenbrunn, San Diego, CA (US); Gang A. Xiao, San Diego, CA (US); Jon J. Anderson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 13/333,553

(22) Filed: Dec. 21, 2011

(65) Prior Publication Data

US 2012/0176898 A1 Jul. 12, 2012

Related U.S. Application Data

(60) Provisional application No. 61/430,895, filed on Jan. 7, 2011.

(51) Int. Cl.
*H04L 12/24* (2006.01)
*H04L 12/56* (2006.01)

(52) U.S. Cl.
CPC ............ *H04L 47/193* (2013.01); *H04L 47/14* (2013.01); *H04L 47/27* (2013.01); *H04L 47/32* (2013.01)
USPC ....................................................... 370/232

(58) Field of Classification Search
None
See application file for complete search history.

(56) References Cited

U.S. PATENT DOCUMENTS

| | | | |
|---|---|---|---|
| 6,606,301 B1 * | 8/2003 | Muller et al. ................. | 370/230 |
| 7,349,337 B1 | 3/2008 | Mahdavi | |
| 8,000,256 B2 | 8/2011 | Cha et al. | |
| 2005/0223089 A1 * | 10/2005 | Rhodes ......................... | 709/223 |
| 2008/0016265 A1 * | 1/2008 | Oshikiri et al. ............... | 710/309 |
| 2008/0101354 A1 * | 5/2008 | Arndt ............................ | 370/389 |
| 2008/0291833 A1 * | 11/2008 | Vos et al. ...................... | 370/237 |
| 2009/0103478 A1 | 4/2009 | Sammour et al. | |
| 2009/0175241 A1 * | 7/2009 | Ohta et al. .................... | 370/331 |
| 2010/0034187 A1 | 2/2010 | Kumar | |
| 2010/0208654 A1 | 8/2010 | Sampath et al. | |

(Continued)

FOREIGN PATENT DOCUMENTS

| | | |
|---|---|---|
| EP | 2077688 | 7/2009 |
| JP | 2008011201 A | 1/2008 |

(Continued)

OTHER PUBLICATIONS

International Search Report and Written Opinion—PCT/US2011/066809—ISA/EPO—Mar. 21, 2012.

*Primary Examiner* — John Blanton
(74) *Attorney, Agent, or Firm* — Patterson & Sheridan, L.L.P.

(57) ABSTRACT

Certain aspects of the present disclosure relate to wireless communications and methods and apparatus for downlink flow control at a user equipment (UE). Aspects generally include monitoring, by a UE, one or more parameters related to the UE, and selectively dropping received packets based on the one or more parameters in order to trigger a rate control mechanism. Selectively dropping received packets may occur at a Packet Data Convergence Protocol (PDCP) layer in order to reduce a corresponding transmission control protocol (TCP) throughput. Accordingly, packets may be selectively dropped prior to reaching an applications processor.

48 Claims, 8 Drawing Sheets

(56) References Cited

U.S. PATENT DOCUMENTS

| | | |
|---|---|---|
| 2010/0309788 A1 | 12/2010 | Ho et al. |
| 2010/0329279 A1* | 12/2010 | Li et al. .......................... 370/465 |
| 2011/0069750 A1* | 3/2011 | Chengalvala et al. ... 375/240.02 |
| 2011/0205888 A1* | 8/2011 | Laitinen et al. ................ 370/230 |
| 2012/0092991 A1* | 4/2012 | Jeong et al. .................... 370/235 |

FOREIGN PATENT DOCUMENTS

| | | |
|---|---|---|
| JP | 2010273262 A | 12/2010 |
| WO | WO2009045945 | 4/2009 |
| WO | WO-2009081871 A1 | 7/2009 |
| WO | 2011/076384 A1 | 6/2011 |

* cited by examiner

DOWNLINK FLOW CONTROL USING PACKET DROPPING TO CONTROL TRANSMISSION CONTROL PROTOCOL (TCP) LAYER THROUGHPUT

CROSS-REFERENCE TO RELATED APPLICATIONS

This application claims benefit of priority to U.S. Provisional Application Ser. No. 61/430,895, filed on Jan. 7, 2011, which is expressly herein incorporated by reference.

BACKGROUND

1. Field

Aspects of the present disclosure generally relate to wireless communication and, more particularly, downlink flow control based on limitations at a user equipment (UE).

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3$^{rd}$ Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. The forward communication link and the reverse communication link may be established via a single-input single-output, multiple-input single-output or a multiple-input multiple-output system.

A wireless multiple-access communication system can support a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

The 3GPP LTE represents a major advance in cellular technology and it is a next step forward in cellular 3$^{rd}$ generation (3G) services as a natural evolution of Global System for Mobile Communications (GSM) and Universal Mobile Telecommunications System (UMTS). The LTE provides for an uplink speed of up to 75 megabits per second (Mbps) and a downlink speed of up to 300 Mbps, and brings many technical benefits to cellular networks. The LTE is designed to meet carrier needs for high-speed data and media transport as well as high-capacity voice support. The bandwidth may be scalable from 1.25 MHz to 20 MHz. This suits the requirements of different network operators that have different bandwidth allocations, and also allows operators to provide different services based on spectrum. The LTE is also expected to improve spectral efficiency in 3G networks, allowing carriers to provide more data and voice services over a given bandwidth.

Physical layer (PHY) of the LTE standard is a highly efficient means of conveying both data and control information between an enhanced base station (eNodeB) and mobile user equipment (UE). The LTE PHY employs advanced technologies that are new to cellular applications. These include Orthogonal Frequency Division Multiplexing (OFDM) and Multiple Input Multiple Output (MIMO) data transmission. In addition, the LTE PHY uses OFDMA on the downlink and Single Carrier-Frequency Division Multiple Access (SC-FDMA) on the uplink. OFDMA allows data to be directed to or from multiple users on a subcarrier-by-subcarrier basis for a specified number of symbol periods.

3GPP LTE Release 8 specifications provide a set of frequency bands on which an LTE system can be deployed. The usage of bands can vary from country to country based on prevalent frequency allocation policies. Within a band, an actual carrier frequency being utilized can also vary from one service provider to another. The 3GPP USIM (UMTS Subscriber Identity Module) may only provide a list of PLMN IDs (Public Land Mobile Network Identifications), which may comprise a 3-bit Mobile Country Code (MCC) and a 3-bit Network Color Code (NCC). However, the PLMN ID may not provide an indication about a band to be used, and, also, it may not comprise information about a specific carrier frequency on which a desired service provider exists. User equipment (UE) operating in the LTE system may be supposed to learn and maintain an adaptive list of carrier frequencies and band information as it successfully acquires services in various countries and service providers. Hence, the UE may be required to always perform a frequency scan when attempting initial acquisition.

SUMMARY

In an aspect of the disclosure, a method for wireless communications is provided. The method generally includes monitoring, by a user equipment (UE), one or more parameters related to the UE, and selectively dropping received packets based on the one or more parameters in order to trigger a rate control mechanism in the UE.

In an aspect of the disclosure, an apparatus for wireless communications is provided. The apparatus generally includes means for means for monitoring, by a user equipment (UE), one or more parameters related to the UE, and means for selectively dropping received packets based on the one or more parameters in order to trigger a rate control mechanism in the UE.

In an aspect of the disclosure, an apparatus for wireless communications is provided. The apparatus generally includes at least one processor and a memory coupled to the at least one processor. The at least one processor is generally configured to monitor, by a user equipment (UE), one or more parameters related to the UE, and selectively drop received packets based on the one or more parameters in order to trigger a rate control mechanism in the UE.

In an aspect of the disclosure, a computer-program product for wireless communications is provided. The computer-program product generally includes a non-transitory computer-readable medium having code stored thereon. The code is generally executable by one or more processors for monitoring, by a user equipment (UE), one or more parameters related to the UE, and selectively dropping received packets based on the one or more parameters in order to trigger a rate control mechanism in the UE.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure use system triggers such as, for example, temperature of a device, available memory, and/or processing power to trigger downlink flow control at a user equipment (UE). According to aspects, received internet protocol (IP) packets may be dropped at a packet data convergence protocol (PDCP) layer, before being transferred to an applications processor, in an effort to reduce the corresponding transmission control protocol (TCP) layer throughput. Accordingly, aspects of the present disclosure allow a UE to reduce a downlink data rate in an effort to enhance user experience and free resources.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that use E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

An access point ("AP") may comprise, be implemented as, or known as NodeB, Radio Network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Figure 1:
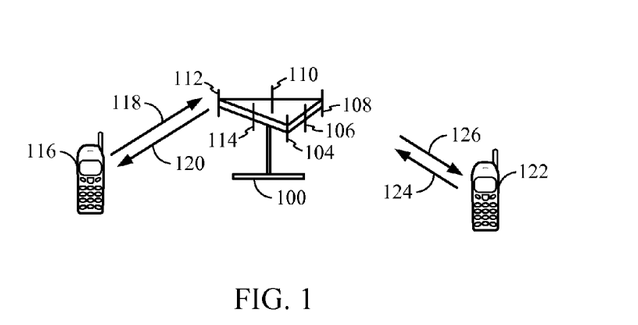
FIG. 1 illustrates an example multiple access wireless communication system, in accordance with aspects of the present disclosure.

Referring to FIG. 1, a multiple access wireless communication system according to one aspect of the present disclosure is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
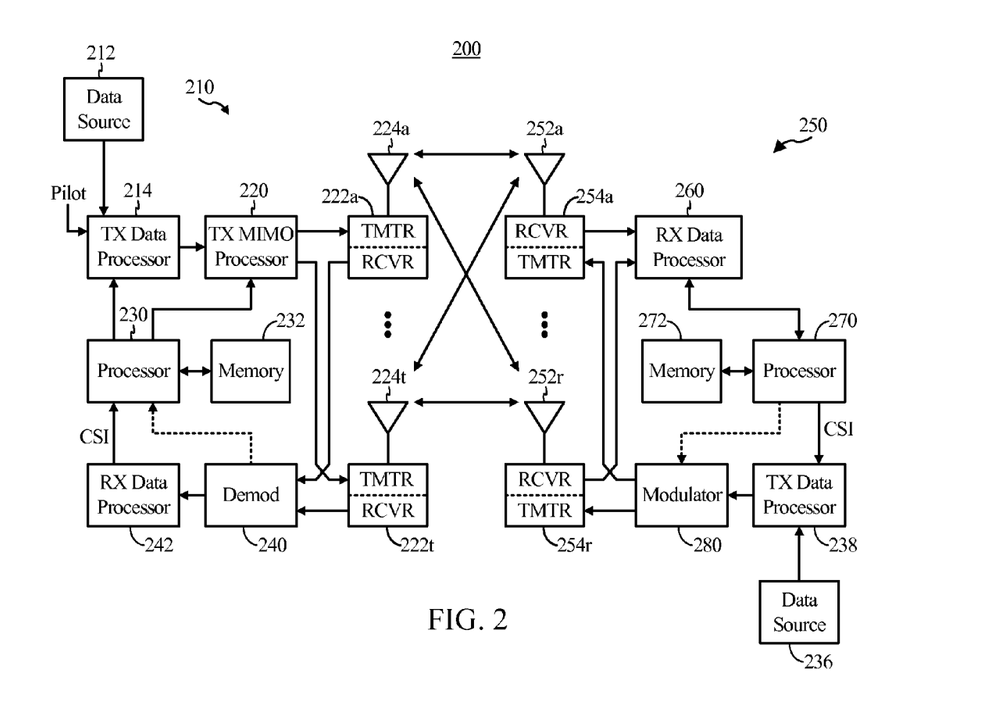
FIG. 2 illustrates a block diagram of an access point and a user terminal in accordance, with aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
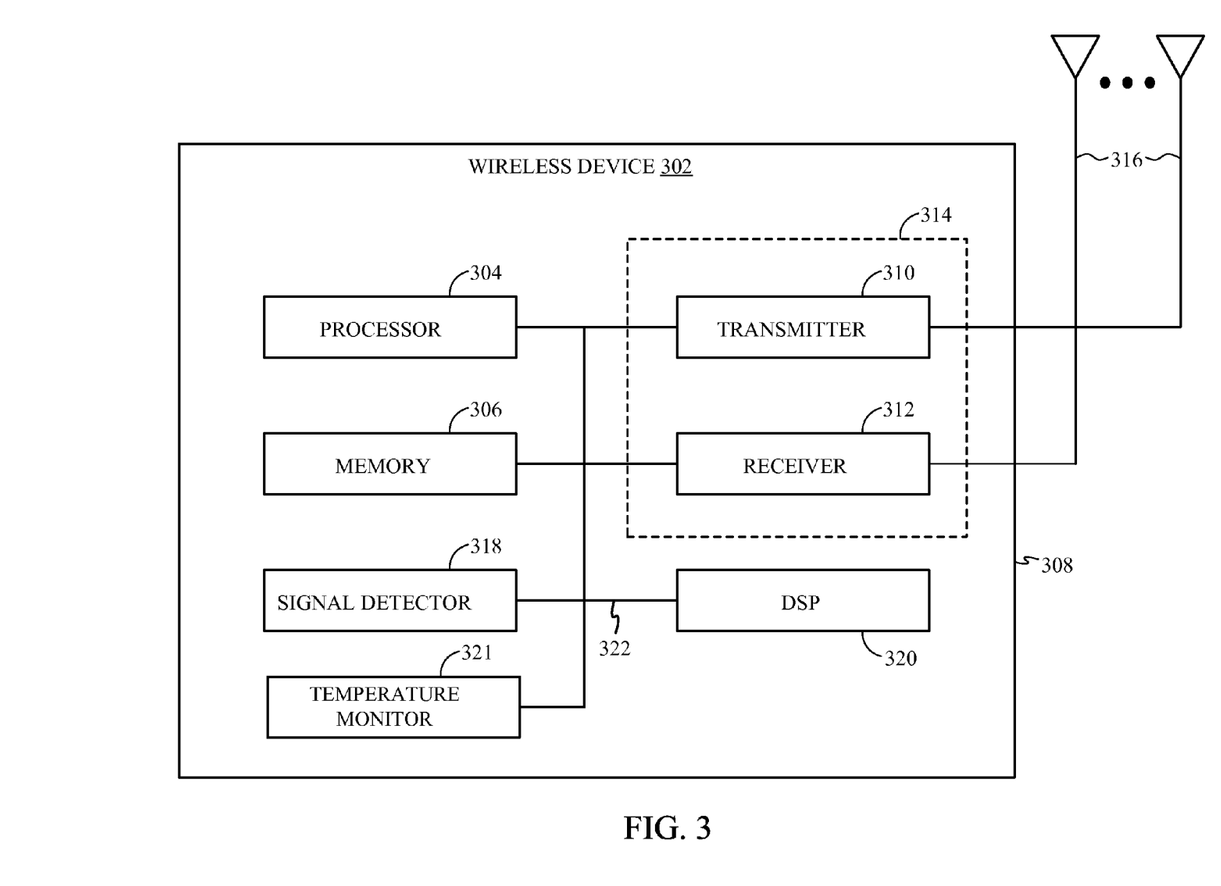
FIG. 3 illustrates a block diagram of an example wireless device, in accordance with aspects of the present disclosure.

FIG. 3 illustrates various components that may be utilized in a wireless device 302 that may be employed within the wireless communication system from FIG. 1. The wireless device 302 is an example of a device that may be configured to implement the various methods described herein. The wireless device 302 may be an access point 100 from FIG. 1 or any of access terminals 116, 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals. In some aspects, the wireless device 302 may include one or more monitors, for example, a temperature monitor 321. The temperature monitor 321 is configured to measure the temperatures of one or more components of the wireless device 302 (e.g., a power amplifier, not shown). While the monitor is shown as a temperature monitor 321 in FIG. 3, it is contemplated that certain aspects of the present disclosure may utilize other suitable monitors, including but not limited to a CPU monitor and a memory monitor, having one or more corresponding sensor components for detecting one or more UE parameters or metrics.

The various components of the wireless device 302 may be coupled together by a bus system 322, which may include a power bus, a control signal bus, and a status signal bus in addition to a data bus.

Certain aspects of the present disclosure support methods for performing frequency scan by user mobile device, such as the access terminals 116, 122 from FIG. 1, the access terminal 250 from FIG. 2 and the wireless device 302 from FIG. 3. In an aspect, the frequency scan may be performed without any prior acquisition information at the mobile device, which may be referred to as Full Frequency Scan (FFS). In another aspect, the frequency scan may be performed using prior successful acquisition information stored at the mobile device, which may be referred to as List Frequency Scan (LFS). The 3GPP LTE system may be deployed using either frequency division duplex (FDD) mode or time division duplex (TDD) mode. The proposed frequency scan algorithms (i.e., the FFS and LFS) may support both the FDD and TDD modes of operation.

LTE Downlink Flow Control

Due to resource limitations at a UE, in certain scenarios, downlink flow control may be desirable to regulate how an applications subsystem receives and processes data packets. System triggers such as, for example, memory size, processing power, and/or acceptable device temperature may be used to trigger downlink flow control. Various techniques are described herein with reference to an LTE network as a specific, but not limiting, example of a network in which the techniques may be used. However, those skilled in the art will appreciate that the techniques may be applied more generally in various types of wireless networks.

When flow control is triggered, the UE may selectively drop packets to control the transmission control protocol (TCP) throughput, in an effort to free resources at the UE. According to aspects, packets may be selectively dropped at a packet data convergence protocol (PDCP) layer, before the packets are transferred to an applications layer.

As will be described in more detail below, a UE may implement active buffer management to trigger a rate control mechanism in an effort to control downlink flow. Rate control may be performed by threshold based methods, which may include centralized flow control. By triggering a rate control mechanism at the UE, buffer management may be performed closer to the source of congestion and may allow downlink rate control without using additional network resources.

Figure 4:
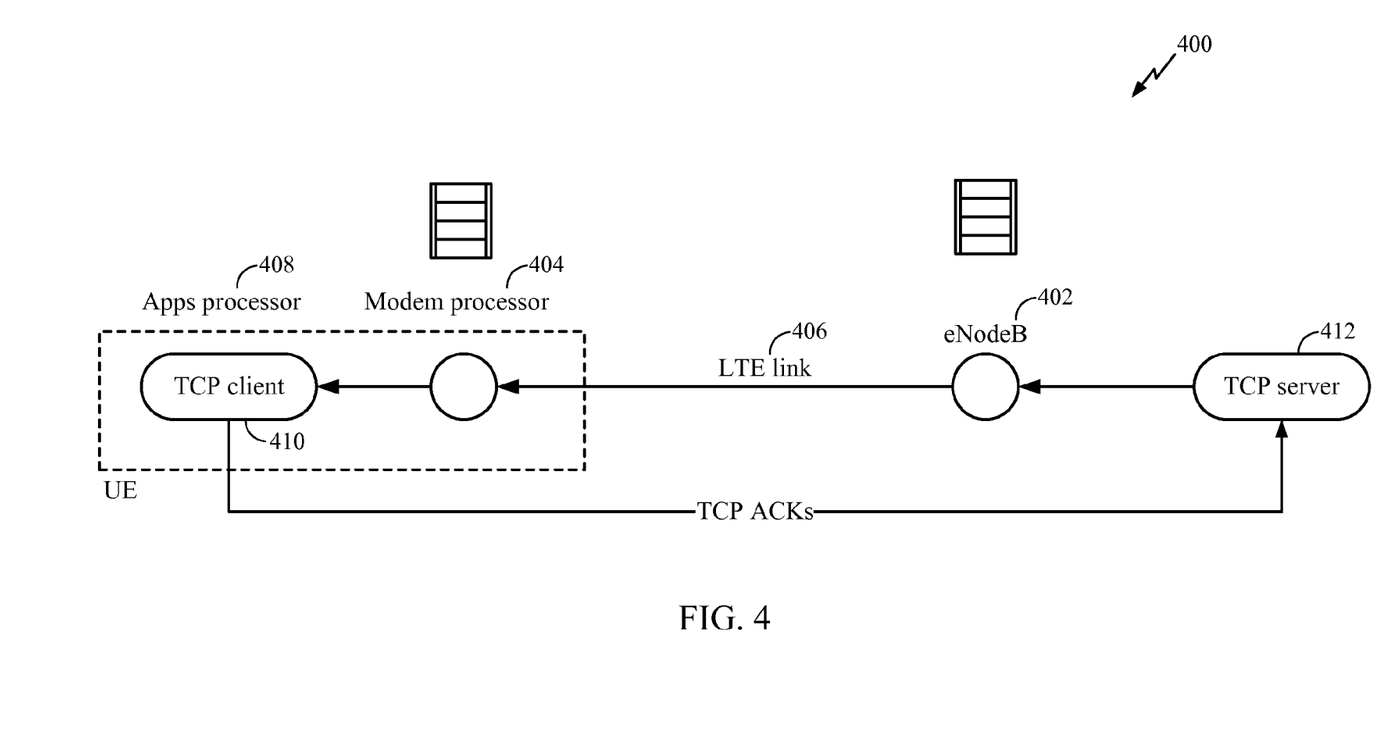
FIG. 4 illustrates an example system architecture, in accordance with aspects of the present disclosure.

FIG. 4 illustrates an example system architecture 400 according to aspects of the present disclosure. An eNB 402 may transmit packets to a modem processor 404 of a UE via a communication link, such as an LTE link 406. Modem processor 404 may transmit packets to an applications processor 408. A TCP client 410 may transmit TCP acknowledgments and/or negative acknowledgments to a TCP server 412.

While the applications processor 408 may receive packets at any rate, in certain scenarios, it may not be able to process the received packets as quickly as they are arriving on the LTE link 406.

Because data may be lost when buffers at a UE reach their capacity, according to aspects, downlink flow control methods described herein may be implemented to help free resources at a UE. For example, it may be desirable to set thresholds for buffers in an effort to avoid data loss in bursts and temporary timing out of the TCP. Buffer thresholds may depend on a rate at which the applications processor 408 processes received data.

As will be described in more detail below, the UE may provide an interface for the applications processor 408 to determine a desired rate. For example, an applications programming interface (API) may allow the applications processor 408 to provide the modem processor 404 with a desired processing rate. When provided, the desired rate may be used to tune one or more buffer thresholds and/or a packet dropping rate.

According to aspects, a UE may implement centralized downlink flow control. Centralized flow control may be triggered based on a memory-related parameter, for example, if the UE begins to run out of global memory. A UE may begin to run out of memory, for example distributed shared memory (DSM) items, when the UE has too much data stored in uplink and downlink buffers. According to aspects of centralized flow control, the UE may drop TCP packets. For example, the UE may periodically drop TCP packets based on a default time period. The default time period may be dictated by a dynamic algorithm which will be described in more detail below.

Figure 5:
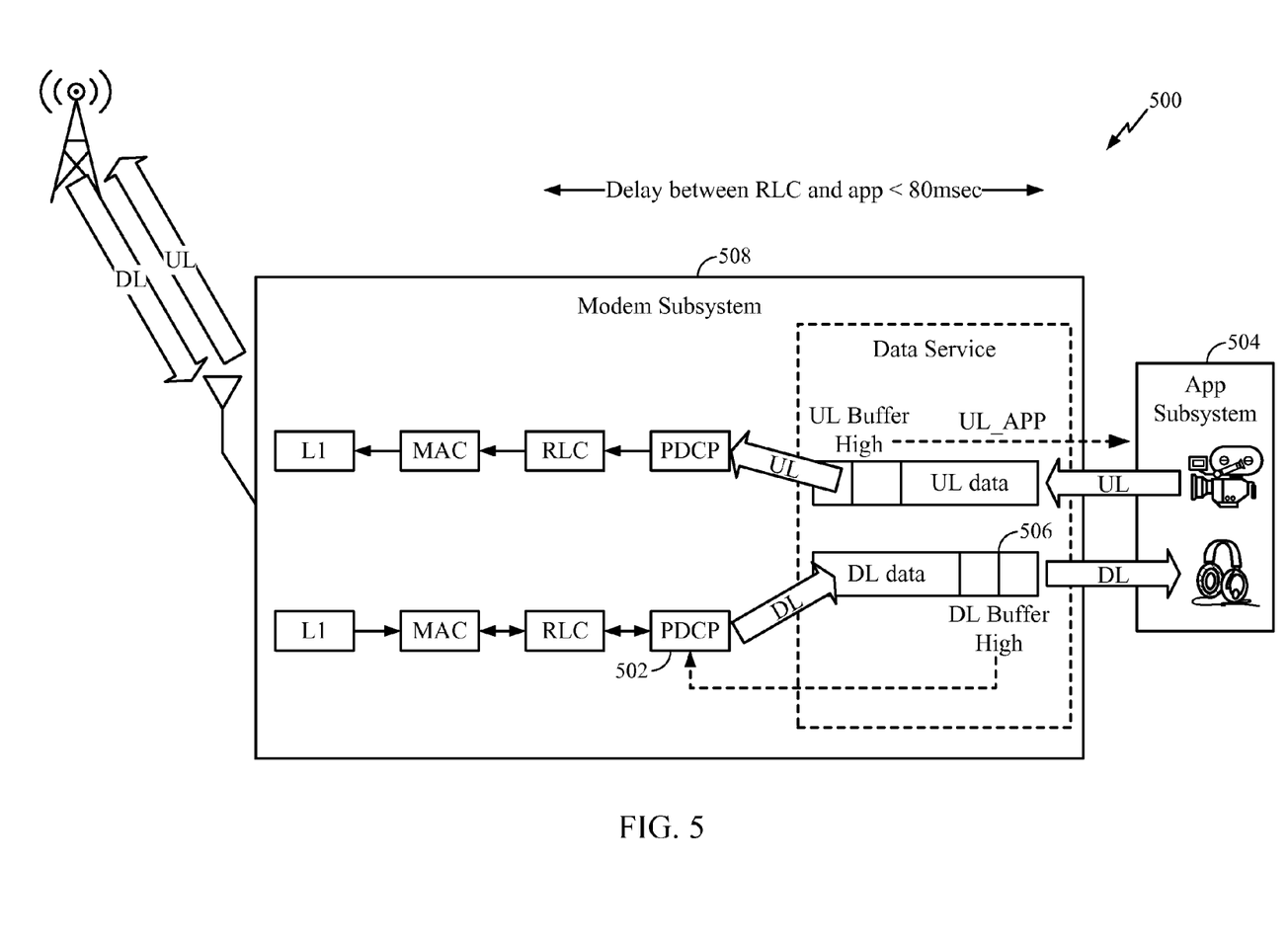
FIG. 5 illustrates an example buffer threshold based approach to downlink flow control, in accordance with aspects of the present disclosure.

FIG. 5 illustrates an example of threshold based flow control 500 in accordance with aspects of the present disclosure. Downlink packets received by a UE may reach the PDCP layer 502 of the modem subsystem 508. According to aspects, the applications subsystem 504 may be unable to process the received packets (e.g., packets successfully received by the PDCP layer 502).

According to aspects, one or more thresholds may be set such that delay on the receive path is below a threshold. For example, a threshold may ensure that the delay between the radio link control (RLC) and applications subsystem 504 is less than a value (e.g., 80 msec). When a buffer reaches a threshold 506, the UE may periodically drop packets in order to reduce a TCP window size.

According to aspects, when a buffer reaches a threshold 506, the PDCP layer 502 may selectively drop received packets. According to aspects, selectively dropping packets may occur prior to transferring the packets from a modem to an applications processor. Dropped packets will not be received at the applications subsystem 504 or the TCP client. Thus, dropped packets at the applications layer may indicate that the TCP layer may need to reduce its rate.

The TCP client may transmit a TCP negative acknowledgement (NACK) when it does not receive a dropped packet and/or duplicate acknowledgments for previously received packets to the TCP server. Such negative acknowledgments and/or duplicate acknowledgments for previously received packets may cause a reduction in the TCP window size thereby reducing the TCP throughput. Accordingly, a load on the PDCP layer may be reduced.

Figure 6:
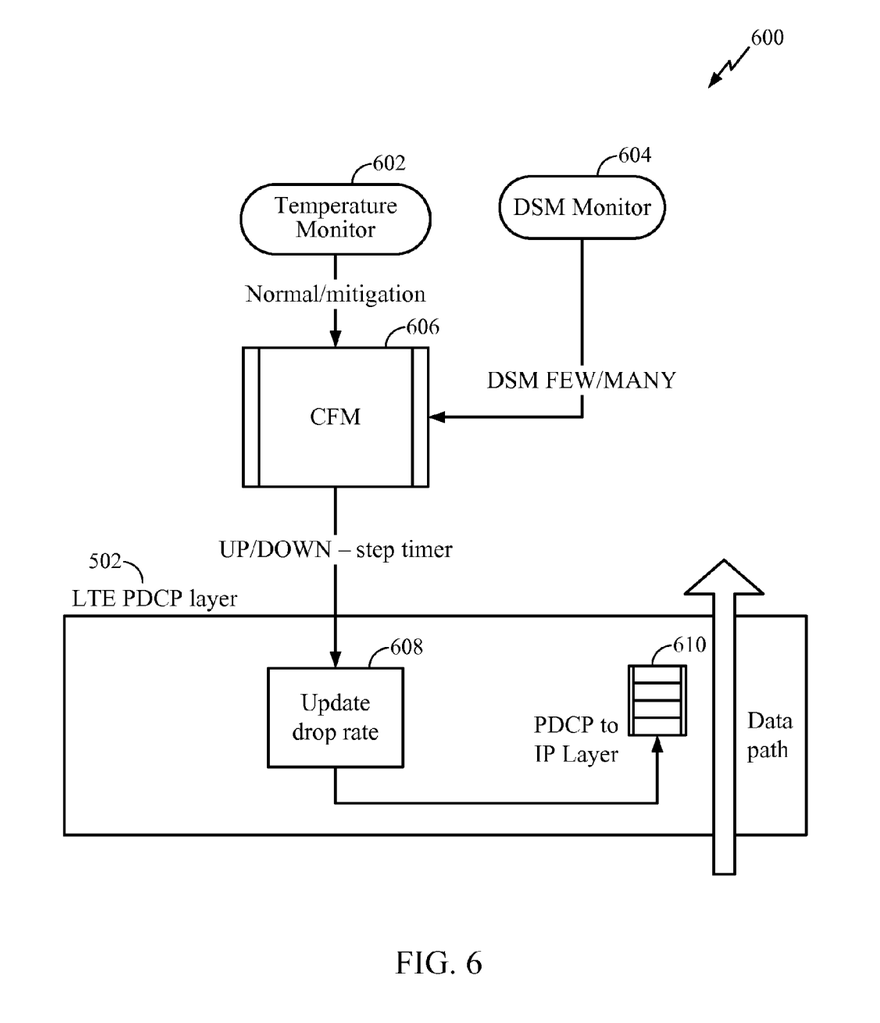
FIG. 6 illustrates an example of centralized downlink flow control based on monitored parameters, in accordance with aspects of the present disclosure.

FIG. 6 illustrates an example 600 of centralized downlink flow control based parameters monitored at a UE. According to aspects, a UE may monitor one or more parameters including a temperature-related parameter, processing power-related parameter and/or memory-related parameter. For example, a temperature monitor 602 may observe the temperature of one or more devices at the UE including, for example, a modem and a battery. Since battery temperature is typically related to an uplink transmit power, according to aspects, the temperature monitor 602 may observe the battery temperature after the uplink data rate has reached a rate (e.g., a maximum or minimum rate). A DSM monitor 604 may observe the available global memory at a UE by observing DSM item availability.

A centralized flow control module (CFM) 606 may determine whether to trigger downlink flow control based on the one or more parameters received from one or more monitors or sensors, for example, the temperature monitor 602 and DSM monitor 604. As described above with reference to FIG. 5, the PDCP layer 502 may periodically drop packets in order to reduce a TCP window size based on the observed parameters.

According to aspects, based on a temperature of a device at a UE, processing power usage, and/or memory usage (e.g., a number of DSM items), the CFM 606 may indicate to the PDCP layer 502 to adjust a rate at which packets are dropped. Adjusting the rate at which packets are dropped may trigger a rate control mechanism at the UE. For example, a high battery or modem temperature and/or a limited number of DSM items may indicate that the PDCP layer should increase the rate at which packets are dropped in an effort to reduce downlink flow. Consequently, UE TCP NACKs and/or duplicate acknowledgements may increase which may cause a reduction in TCP window size thereby providing downlink rate flow control.

At 608, the packet drop rate may be updated based on a received indication from the CFM 606. The updated drop rate may adjust the rate at which packets are dropped from the PDCP layer and, consequently, adjust the rate at which packets are buffered, at 610.

According to aspects, PDCP packets greater than a predetermined size may be selectively dropped when the CFM 606 triggers downlink flow control. The predetermined size may be selected to be greater than a size of expected control packets. Selectively dropping only packets larger than, for example, 200 bytes may ensure that TCP acknowledgments are not dropped. By not dropping packets which are below the predetermined threshold, including TCP acknowledgments, the UE may ensure dropped packets have an effect on the downlink flow control.

Figure 7:
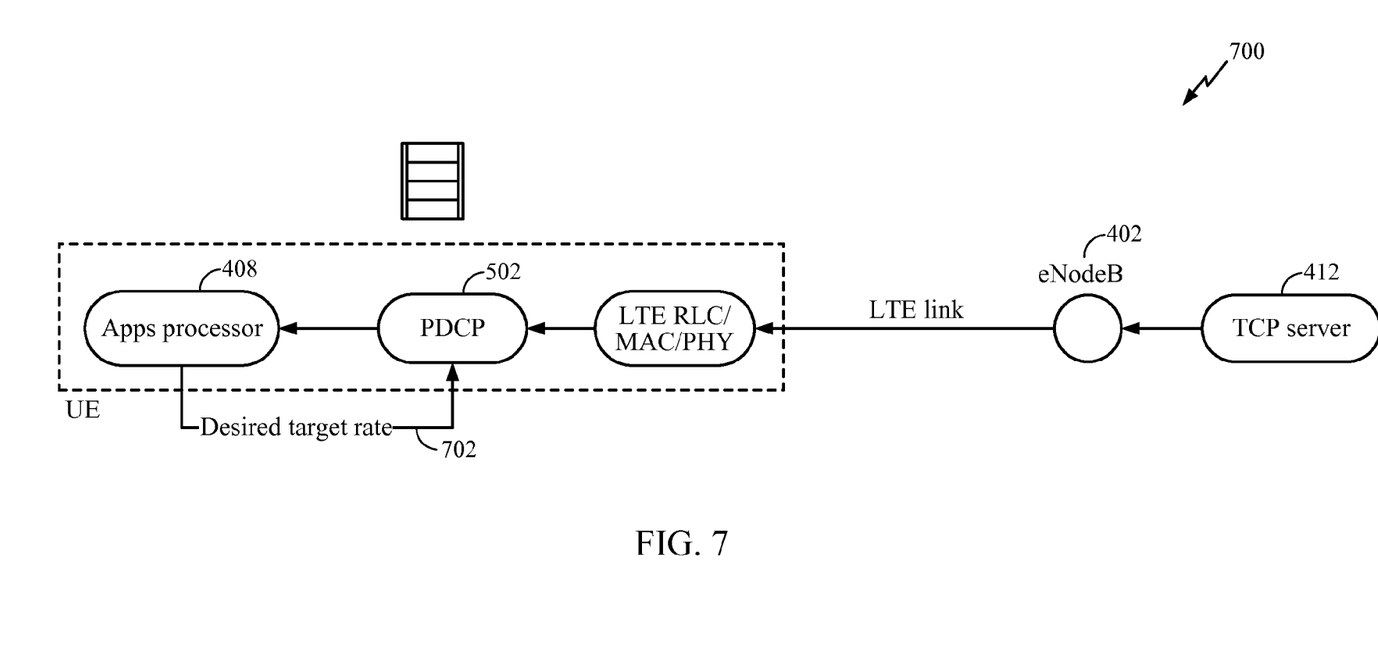
FIG. 7 illustrates an example of downlink flow control, in accordance with aspects of the present disclosure.

FIG. 7 illustrates an example downlink flow control method 700, according to aspects of the present disclosure. As previously described, in certain scenarios, the applications processor 408 may provide the modem with a desired rate for receiving data.

An API may allow the applications processor 408 to provide the modem subsystem with a desired processing rate. When provided, the desired rate may be used to tune a buffer threshold and packet dropping rate. For example, the applications processor 408 may determine a desired target rate 702 and transmit the rate to the PDCP layer 502 of the modem subsystem.

In this case, the UE may not need to dynamically adjust a drop rate of PDCP packets. Instead, the UE may adjust the buffering of packets based on the desired output target rate of the applications processor 408.

Parameters related to downlink flow control may be calculated using the desired output target rate of the applications processor. According to aspects, after the applications processor 408 reaches a first threshold T1, one out of every n packets may be dropped, according to the following functions.

$$T1 = \text{rate} * \text{rtt}$$

$$n = 2 * \text{rate} * \text{rtt} / \text{MSS}$$

The first threshold T1 may be calculated based on the desired output rate of the applications processor and the TCP round trip time (rtt). The TCP round trip time may not be available at the PDCP layer. Thus, according to aspects, the UE may determine the round trip time based on, for example, a cumulative distributive function of TCP round trip time. In a scenario, the round trip time may be set to a worst case rtt. In another scenario, the rtt may not exceed a value, such as 200 ms, and may be set to, for example, 60 msec. However, other values may be employed.

The UE may determine a number of packets n that may be dropped, after reaching the threshold T1, based on the rate provided by the applications processor, TCP rtt, and a maximum TCP segment size (MSS). According to aspects, the MSS may be set to a value, such as 1400 bytes. However, other values may be employed.

According to aspects, after reaching a second threshold T2, all incoming packets may be dropped. The second threshold T2 may indicate a maximum amount of data that may be stored in a buffer. Thus, after reaching threshold T2, all incoming packets may be dropped. A buffer may reach threshold T2, for example, if previous flow control methods did not free up enough resources at the UE. According to aspects, threshold T2 may be any value larger (e.g., sufficiently larger) than threshold T1.

If the applications processor has not provided a desired target rate 702, according to aspects, a target rate may be selected based on available information at the UE. The selected target rate may be used to calculate T1, T2, and/or n.

Figure 8:
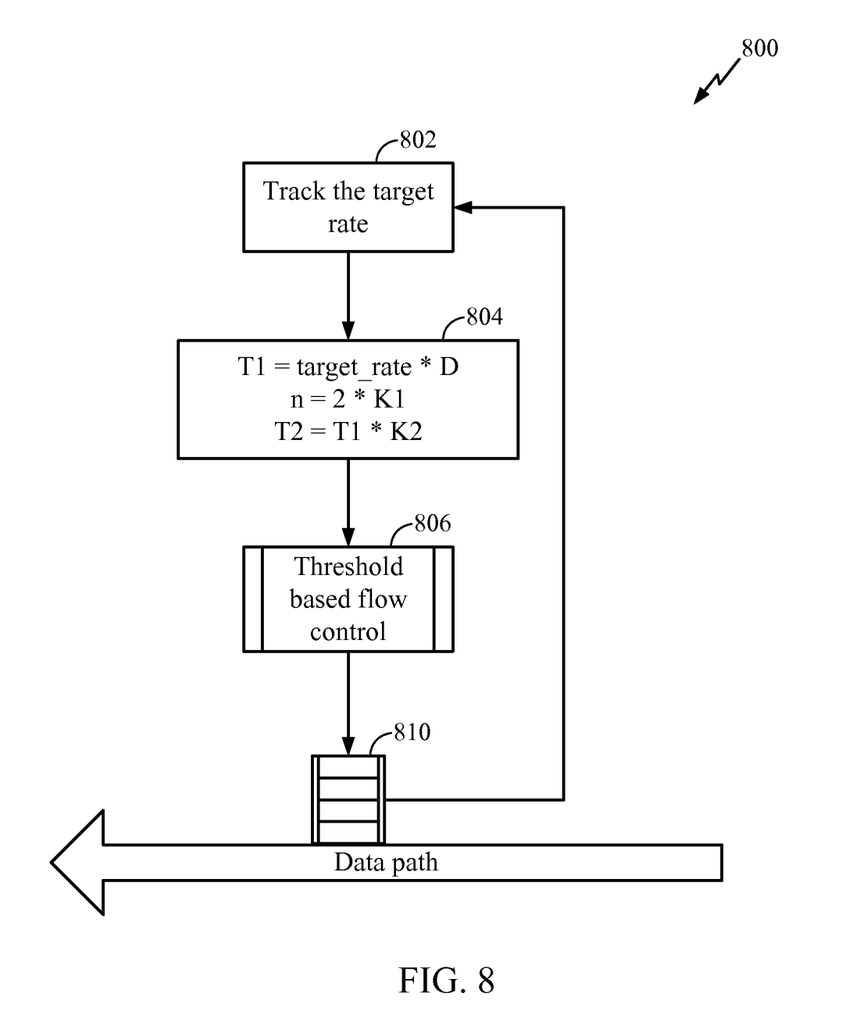
FIG. 8 illustrates an example algorithm for downlink flow control, in accordance with aspects of the present disclosure.

FIG. 8 illustrates an example 800 buffer threshold based flow control, according to aspects of the present disclosure. At

802, a target output rate of an applications processor may be tracked. The rate may be determined by the applications processor and transmitted to the modem, or may be estimated based on available information at the UE. Based on the target rate, parameters for downlink flow control, T1, T2, and/or n, may be calculated at 804. According to aspects, T1 may be calculated using some delay D, n may be calculated using a coefficient K1, and T2 may be calculated using a coefficient K2.

At 806, thresholds T1 and T2 may be used as thresholds to trigger downlink flow control at the PDCP layer. For example, when a buffer reaches threshold T1, one out of n packets may be dropped. The packets may be dropped prior to transferring them from a modem to an applications processor. If a buffer threshold T2 is reached, all incoming packets from the modem may be dropped.

Packets that are passed from the modem to the applications processor may be buffered at 810. According to aspects, the average delay observed by packets in the PDCP buffer 810 may be used to trigger downlink flow control. If, for example, the PDCP layer observes that a packet remains in the PDCP buffer for 300 ms, downlink flow control may be triggered.

The average rate at which the applications processor reads data from the PDCP buffer 810 may be used to trigger downlink flow control. For example, the amount of unread data in a buffer used to transfer data from a PDCP layer to an applications processor may be used to trigger downlink flow control. Based on the amount of unread data in the buffer and/or a rate at which the applications processor reads data from the buffer, the UE may dynamically adjust the buffer size and/or packet dropping rate to achieve a desired target rate at the applications processor. Additionally or alternatively, an amount of time unread data is in the buffer may be used to trigger downlink flow control.

Figure 9:
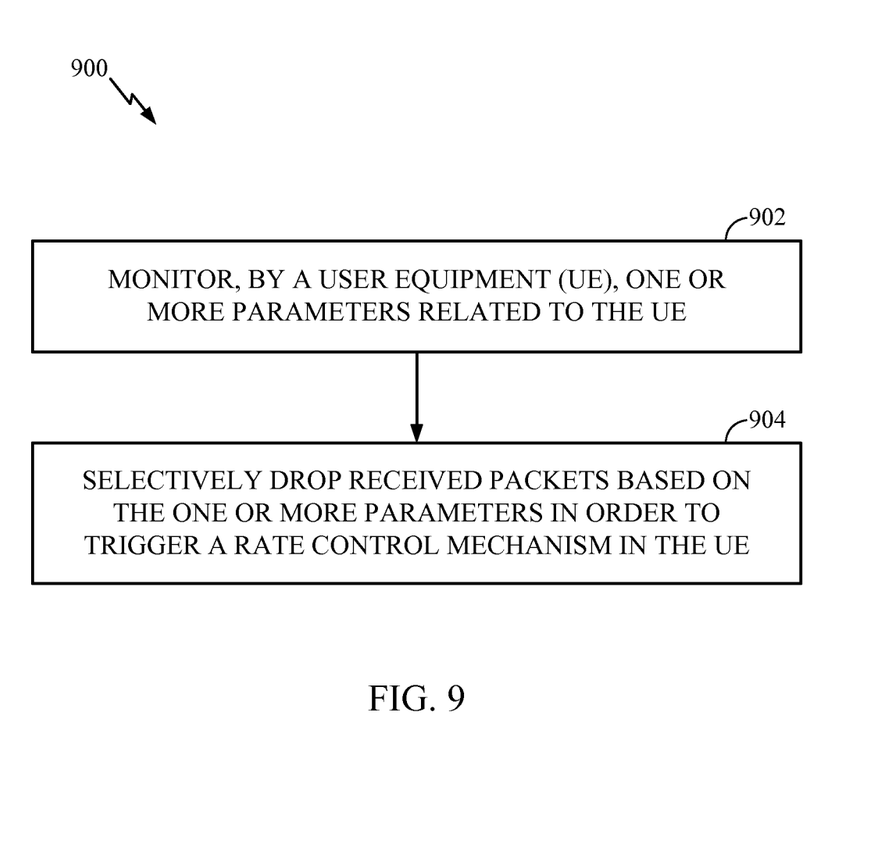
FIG. 9 illustrates example operations performed, for example, by a UE, for downlink flow control, in accordance with aspects of the present disclosure.

FIG. 9 illustrates example operations 900 which may be performed for downlink flow control, for example by a UE, according to aspects of the present disclosure. At 902, a UE may monitor one or more parameters related to the UE. At 904, the UE may selectively drop received packets based on the one or more parameters in order to trigger a rate control mechanism in the UE. The packets may be dropped at a PDCP layer, prior to being transmitted to an applications layer.

Aspects of the present disclosure provide techniques for downlink flow control based on parameters observed at a UE. As described herein, packets may be selectively dropped at a PDCP layer in an effort to reduce a corresponding TCP layer throughput. Packets dropped at a PDCP layer will not reach the applications processor. Accordingly, a TCP client may send negative acknowledgments to a TCP server and/or duplicate acknowledgments for previously received packets, to trigger downlink flow control.

According to aspects, downlink flow control may be triggered by one or more parameters related to a UE, including, for example, temperature of one or more devices at a UE, available global memory, delay observed by packets in the PDCP buffer, and/or a rate at which the applications processor processes data from the PDCP layer. Based on these parameters, the UE may adjust the rate at which packets are dropped at the PDCP layer.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
    monitoring, by a user equipment (UE), one or more parameters related to the UE; and
    selectively dropping received packets based on the one or more parameters in order to trigger a rate control mechanism in the UE, wherein selectively dropping packets based on the one or more parameters comprises adjusting a rate at which the packets are dropped.

2. The method of claim 1, wherein selectively dropping received packets based on the one or more parameters comprises:
    dropping packets periodically in order to reduce a transmission control protocol (TCP) window size.

3. The method of claim 1, wherein selectively dropping received packets based on the one or more parameters comprises:
    selectively dropping packets at a Packet Data Convergence Protocol (PDCP) layer in order to reduce a corresponding transmission control protocol (TCP) layer throughput.

4. The method of claim 1, wherein selectively dropping received packets based on the one or more parameters comprises:
    selectively dropping only packets greater than a predetermined size.

5. The method of claim 4, wherein the predetermined size is selected to be greater than a size of an expected control packet.

6. The method of claim 1, wherein the one or more parameters comprise:
    at least one of a temperature of the UE or a temperature of a device on the UE.

7. The method of claim 1, wherein the one or more parameters comprise:
    at least one of a memory-related parameter or a processing power-related parameter.

8. The method of claim 1, wherein the one or more parameters comprise:
    at least one of an amount of unread data in a buffer used to transfer data from a Packet Data Convergence Protocol (PDCP) layer to an applications processor or an amount of time unread data is in the buffer.

9. The method of claim 1, wherein the one or more parameters comprise:
    a rate at which an applications processor reads data from a buffer used to transfer data from a Packet Data Convergence Protocol (PDCP) layer to the applications processor.

10. The method of claim 9, further comprising:
    at least one of dynamically adjusting a size of the buffer or adjusting the rate to a desired target rate.

11. The method of claim 1 wherein the one or more parameters include a rate provided to a modem of the UE by an applications processor of the UE via an application programming interface.

12. The method of claim 1, wherein selectively dropping received packets occurs prior to transferring the packets from a modem to an applications processor.

13. An apparatus for wireless communications, comprising:
    means for monitoring, by a user equipment (UE), one or more parameters related to the UE; and
    means for selectively dropping received packets based on the one or more parameters in order to trigger a rate control mechanism in the UE, wherein the means for selectively dropping received packets based on the one or more parameters comprises means for adjusting a rate at which the packets are dropped.

14. The apparatus of claim 13, wherein the means for selectively dropping received packets based on the one or more parameters comprises:
    means for dropping packets periodically in order to reduce a transmission control protocol (TCP) window size.

15. The apparatus of claim 13, wherein the means for selectively dropping received packets based on the one or more parameters comprises:
    means for selectively dropping packets at a Packet Data Convergence Protocol (PDCP) layer in order to reduce a corresponding transmission control protocol (TCP) layer throughput.

16. The apparatus of claim 13, wherein the means for selectively dropping received packets based on the one or more parameters comprises:
   means for selectively dropping only packets greater that a predetermined size.

17. The apparatus of claim 16, wherein the predetermined size is selected to be greater than a size of an expected control packet.

18. The apparatus of claim 13, wherein the one or more parameters comprise:
   at least one of a temperature of the UE or a temperature of a device on the UE.

19. The apparatus of claim 13, wherein the one or more parameters comprise:
   at least one of a memory-related parameter or a processing power-related parameter.

20. The apparatus of claim 13, wherein the one or more parameters comprise:
   at least one of an amount of unread data in a buffer used to transfer data from a Packet Data Convergence Protocol (PDCP) layer to an applications processor or an amount of time unread data is in the buffer.

21. The apparatus of claim 13, wherein the one or more parameters comprise:
   a rate at which an applications processor reads data from a buffer used to transfer data from a Packet Data Convergence Protocol (PDCP) layer to the applications processor.

22. The apparatus of claim 21, further comprising:
   means for at least one of dynamically adjusting a size of the buffer or adjusting the rate to a desired target rate.

23. The apparatus of claim 13 wherein the one or more parameters include a rate provided to a modem of the UE by an applications processor of the UE via an application programming interface.

24. The apparatus of claim 13, wherein selectively dropping received packets occurs prior to transferring the packets from a modem to an applications processor.

25. An apparatus for wireless communications, comprising:
   at least one processor configured to:
      monitor, by a user equipment (UE), one or more parameters related to the UE; and
      selectively drop received packets based on the one or more parameters in order to trigger a rate control mechanism in the UE; and
   a memory coupled to the at least one processor,
   wherein the at least one processor is configured to selectively drop received packets based on the one or more parameters by adjusting a rate at which the packets are dropped.

26. The apparatus of claim 25, wherein the at least one processor is configured to selectively drop received packets based on the one or more parameters by:
   dropping packets periodically in order to reduce a transmission control protocol (TCP) window size.

27. The apparatus of claim 25, wherein the at least one processor is configured to selectively drop received packets based on the one or more parameters by:
   selectively dropping packets at a Packet Data Convergence Protocol (PDCP) layer in order to reduce a corresponding transmission control protocol (TCP) layer throughput.

28. The apparatus of claim 25, wherein the at least one processor is configured to selectively drop received packets based on the one or more parameters by:
   selectively dropping only packets greater that a predetermined size.

29. The apparatus of claim 28, wherein the predetermined size is selected to be greater than a size of an expected control packet.

30. The apparatus of claim 25, wherein the one or more parameters comprise:
   at least one of a temperature of the UE or a temperature of a device on the UE.

31. The apparatus of claim 25, wherein the one or more parameters comprise:
   at least one of a memory-related parameter or a processing power-related parameter.

32. The apparatus of claim 25, wherein the one or more parameters comprise:
   at least one of an amount of unread data in a buffer used to transfer data from a Packet Data Convergence Protocol (PDCP) layer to an applications processor or an amount of time unread data is in the buffer.

33. The apparatus of claim 25, wherein the one or more parameters comprise:
   a rate at which an applications processor reads data from a buffer used to transfer data from a Packet Data Convergence Protocol (PDCP) layer to the applications processor.

34. The apparatus of claim 33, wherein the at least one processor is further configured to:
   at least one of dynamically adjust a size of the buffer or adjusting the rate to a desired target rate.

35. The apparatus of claim 25 wherein the one or more parameters include a rate provided to a modem of the UE by an applications processor of the UE via an application programming interface.

36. The apparatus of claim 25, wherein selectively dropping received packets occurs prior to transferring the packets from a modem to an applications processor.

37. A computer-program product for wireless communications, the computer-program product comprising a non-transitory computer-readable medium having code stored thereon, the code executable by one or more processors for:
   monitoring, by a user equipment (UE), one or more parameters related to the UE; and
   selectively dropping received packets based on the one or more parameters in order to trigger a rate control mechanism in the UE,
   wherein the code for selectively dropping received packets based on the one or more parameters comprises code for adjusting a rate at which the packets are dropped.

38. The computer-program product of claim 37, wherein the code for selectively dropping received packets based on the one or more parameters comprises:
   code for dropping packets periodically in order to reduce a transmission control protocol (TCP) window size.

39. The computer-program product of claim 37, wherein the code for selectively dropping received packets based on the one or more parameters comprises:
   code for selectively dropping packets at a Packet Data Convergence Protocol (PDCP) layer in order to reduce a corresponding transmission control protocol (TCP) layer throughput.

40. The computer-program product of claim 37, wherein the code for selectively dropping received packets based on the one or more parameters comprises:
   code for selectively dropping only packets greater that a predetermined size.

41. The computer-program product of claim 40, wherein the predetermined size is selected to be greater than a size of an expected control packet.

42. The computer-program product of claim 37, wherein the one or more parameters comprise:
 at least one of a temperature of the UE or a temperature of a device on the UE.

43. The computer-program product of claim 37, wherein the one or more parameters comprise:
 at least one of a memory-related parameter or a processing power-related parameter.

44. The computer-program product of claim 37, wherein the one or more parameters comprise:
 at least one of an amount of unread data in a buffer used to transfer data from a Packet Data Convergence Protocol (PDCP) layer to an applications processor or an amount of time unread data is in the buffer.

45. The computer-program product of claim 37, wherein the one or more parameters comprise:
 a rate at which an applications processor reads data from a buffer used to transfer data from a Packet Data Convergence Protocol (PDCP) layer to the applications processor.

46. The computer-program product of claim 45, further comprising:
 code for at least one of dynamically adjusting a size of the buffer or adjusting the rate to a desired target rate.

47. The computer-program product of claim 37 wherein the one or more parameters include a rate provided to a modem of the UE by an applications processor of the UE via an application programming interface.

48. The computer-program product of claim 37, wherein selectively dropping received packets occurs prior to transferring the packets from a modem to an applications processor.

* * * * *